United States Patent
Moyer et al.

(10) Patent No.: US 7,434,264 B2
(45) Date of Patent: Oct. 7, 2008

(54) DATA PROCESSING SYSTEM WITH PERIPHERAL ACCESS PROTECTION AND METHOD THEREFOR

(75) Inventors: William C. Moyer, Dripping Springs, TX (US); Joseph C. Circello, Phoenix, AZ (US); Craig D. Shaw, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 10/384,024

(22) Filed: Mar. 7, 2003

(65) Prior Publication Data

US 2004/0177266 A1 Sep. 9, 2004

(51) Int. Cl.
*H04L 9/32* (2006.01)
*G06G 7/04* (2006.01)
*G06F 3/00* (2006.01)

(52) U.S. Cl. .............................. 726/28; 726/34; 710/36
(58) Field of Classification Search ................ 713/200; 710/36, 110; 726/28, 34
See application file for complete search history.

(56) References Cited

U.S. PATENT DOCUMENTS

| | | | | |
|---|---|---|---|---|
| 4,639,865 A | * | 1/1987 | Martin | 712/226 |
| 4,763,250 A | * | 8/1988 | Keshlear et al. | 711/208 |
| 4,809,160 A | * | 2/1989 | Mahon et al. | 726/4 |
| 4,831,581 A | * | 5/1989 | Rubinfeld | 711/126 |
| 4,890,223 A | * | 12/1989 | Cruess et al. | 711/207 |
| 5,140,684 A | * | 8/1992 | Sakamura et al. | 711/163 |
| 5,367,695 A | * | 11/1994 | Narad et al. | 709/210 |
| 5,423,034 A | * | 6/1995 | Cohen-Levy et al. | 707/10 |

(Continued)

FOREIGN PATENT DOCUMENTS

EP 0 932 096 A2 7/1998

(Continued)

OTHER PUBLICATIONS

Levi, Bozidar, "Unix Administration: A Comprehensive Sourcebook for Effective Systems and Network Management", 2002, CRC Press LLC, Section 2.*

(Continued)

*Primary Examiner*—Ayaz Sheikh
*Assistant Examiner*—Matthew T Henning
(74) *Attorney, Agent, or Firm*—Joanna G. Chiu; Susan C. Hill

(57) ABSTRACT

A flexible peripheral access protection mechanism within a data processing system (10, 100). In one embodiment, each master (14, 15) within the data processing system (10) includes a corresponding privilege level modifier (70, 74) and corresponding trust attributes (71, 72, 75, 76) for particular bus access types (e.g. read and write accesses). Also, in one embodiment, each peripheral (22, 24) within the data processing system (10) includes a corresponding trust attribute (80, 84), write protect indicator (81, 85), and a privilege protect indicator (82, 86). Therefore, in one embodiment, a bus access by a bus master to a peripheral is allowed when the bus master has the appropriate privilege level and appropriate level of trust required by the peripheral (and the peripheral is not write protected, if the bus access is a write access). Also, through the use of the privilege level modifiers, a the bus master can be forced to a particular privilege level for a particular bus access.

13 Claims, 4 Drawing Sheets

U.S. PATENT DOCUMENTS

| | | | |
|---|---|---|---|
| 5,450,593 A * | 9/1995 | Howell et al. | 726/21 |
| 5,454,082 A * | 9/1995 | Walrath et al. | 710/108 |
| 5,553,019 A * | 9/1996 | Sandvos et al. | 365/185.04 |
| 5,915,086 A * | 6/1999 | Buzsaki et al. | 726/28 |
| 5,948,097 A * | 9/1999 | Glew et al. | 712/220 |
| 6,046,676 A * | 4/2000 | Ward et al. | 340/572.1 |
| 6,061,753 A * | 5/2000 | Ericson | 710/107 |
| 6,115,819 A * | 9/2000 | Anderson | 713/200 |
| 6,240,469 B1 * | 5/2001 | Ishibashi | 710/33 |
| 6,449,652 B1 * | 9/2002 | Blumenau et al. | 709/229 |
| 6,470,455 B1 * | 10/2002 | Cromer et al. | 726/17 |
| 6,480,941 B1 * | 11/2002 | Franke et al. | 711/153 |
| 6,490,642 B1 * | 12/2002 | Thekkath et al. | 710/110 |
| 6,662,251 B2 * | 12/2003 | Brock et al. | 710/110 |
| 6,694,457 B2 * | 2/2004 | McKee | 714/38 |
| 6,745,307 B2 * | 6/2004 | McKee | 711/163 |
| 6,851,056 B2 * | 2/2005 | Evans et al. | 713/193 |
| 7,043,575 B2 * | 5/2006 | Stephan | 710/36 |
| 7,055,038 B2 * | 5/2006 | Porter et al. | 713/193 |
| 7,216,345 B1 * | 5/2007 | Porter | 718/100 |
| 7,228,569 B2 * | 6/2007 | Barrenscheen | 726/34 |
| 2002/0138677 A1 * | 9/2002 | Brock et al. | 710/110 |
| 2002/0163522 A1 * | 11/2002 | Porter et al. | 345/533 |
| 2003/0172214 A1 * | 9/2003 | Moyer et al. | 710/200 |

FOREIGN PATENT DOCUMENTS

WO      03/077085 A1      9/2003

OTHER PUBLICATIONS

U.S. Appl. No. 10/094,082 entitled "Data Processing System With Peripheral Access Protection and Method Therefor", filed Mar. 8, 2002 (not published at this time).

Supplementary European Search Report.

* cited by examiner

DATA PROCESSING SYSTEM WITH PERIPHERAL ACCESS PROTECTION AND METHOD THEREFOR

RELATED APPLICATIONS

This application is related to U.S. patent application Ser. No. 10/094,082 entitled "DATA PROCESSING SYSTEM WITH PERIPHERAL ACCESS PROTECTION AND METHOD THEREFOR" filed on Mar. 8, 2002 and assigned to the current assignee hereof.

FIELD OF THE INVENTION

The present invention relates to a data processing system, and more particularly, to a data processing system with peripheral access protection.

RELATED ART

In system on a chip (SoC) solutions, it is common to have multiple masters with shared peripheral devices. Some of the masters of the SoC may be non-trusted masters. In such systems, it may be necessary to protect some or all peripherals from being accessed by the non-trusted masters because such access may result in corruption of the system. For example, viruses may be introduced by software running on the non-trusted masters or the non-trusted masters may be used to gain access to secure information within the peripheral devices of the system. Also, protection of the peripherals may be required in order to ensure secure data transactions.

One prior art solution requires that each master within a system have its own dedicated peripherals such that peripherals are not shared between masters. The use of dedicated peripherals, however, results in the need to replicate many peripherals that could otherwise be shared, thus resulting in increased chip area and cost. Also, the use of masters with dedicated peripherals prevents the use of processing load balancing within the system. For example, a process executed by one master cannot be transferred to another master within the system if it does not have the necessary dedicated peripherals to perform the transferred process, thereby reducing efficiency of the system.

Therefore, a need exists for a data processing system that allows both trusted and non-trusted masters to share peripheral devices within the data processing system while protecting access to these shared peripheral devices by the non-trusted masters.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

One embodiment of the present invention provides a flexible peripheral access protection mechanism within a data processing system in order to obtain a more secure operating environment. For example, the data processing system may include a combination of trusted and untrusted bus masters needing to access shared peripherals. One embodiment allows for the dynamic update by a trusted bus master of privileges and trust attributes for each bus master and of access controls for each peripheral. A trusted bus master is therefore able to establish which bus masters have permission to access which peripheral in order to protect the data processing system from corruption due to errant or hostile software running on untrusted bus masters.

Through the use of a bus master identifier, trust attributes, and privilege levels, access to the requested peripheral can either be allowed or denied based on the permissions established by the trusted bus master. For example, in one embodiment, each master within the data processing system includes a corresponding privilege level modifier and corresponding trust attributes for particular bus access types (such as read and write accesses). Also, in one embodiment, each peripheral within the data processing system includes a corresponding trust attribute, write protect indicator, and a privilege protect indicator. Therefore, in one embodiment, a bus access by a bus master to a peripheral is allowed when the bus master has the appropriate privilege level and appropriate level of trust required by the peripheral (and the peripheral is not write protected, if the bus access is a write access). Also, through the use of privilege level modifiers, a bus master can be forced to a particular privilege level for a particular bus access.

Figure 1:
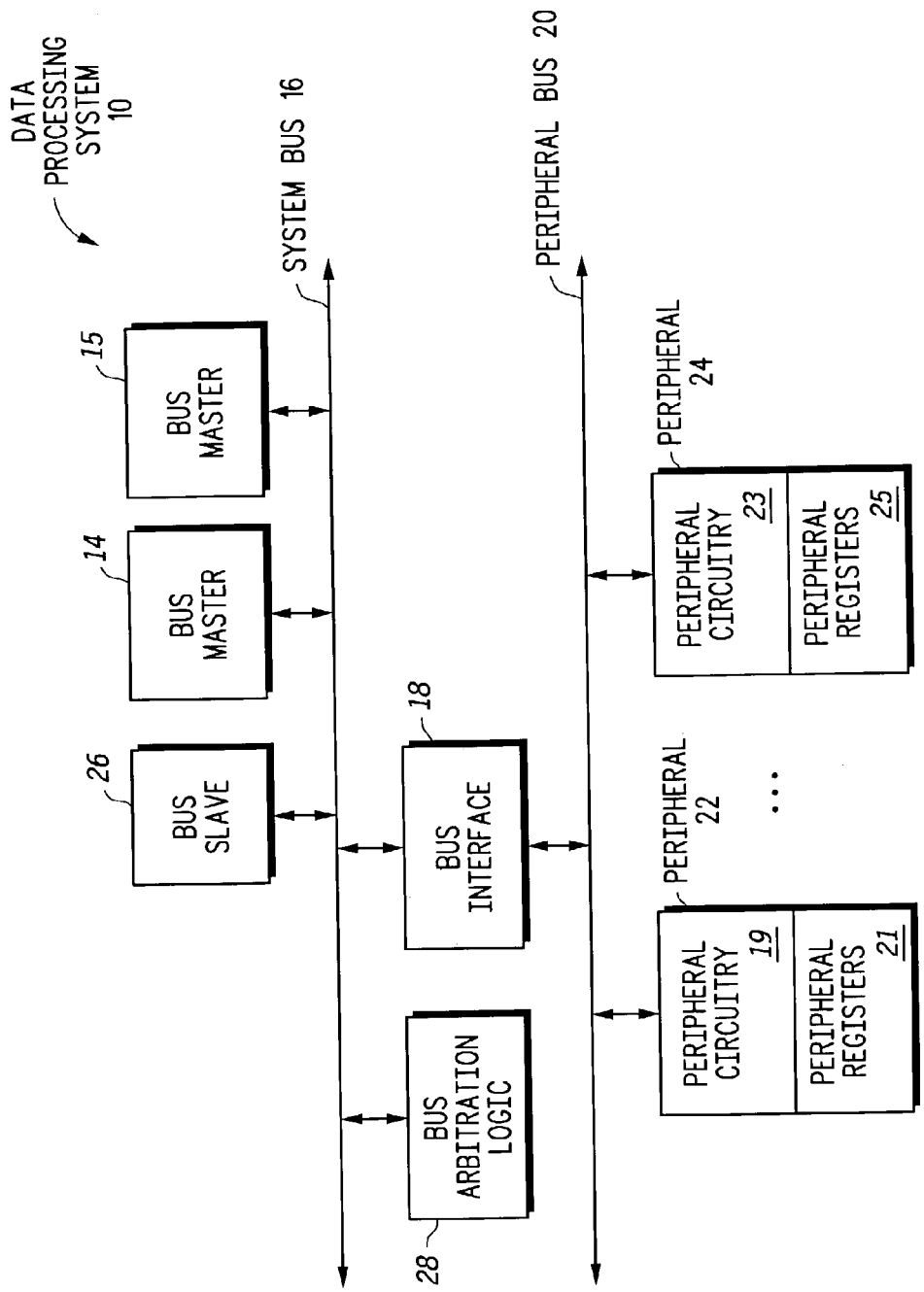
FIG. 1 illustrates, in block diagram form, a data processing system in accordance with one embodiment of the present invention.

FIG. 1 illustrates one embodiment of a data processing system 10. Data processing system 10 includes a bus slave 26, a bus master 14, a bus master 15, bus arbitration logic 28, a system bus 16, a bus interface 18, a peripheral bus 20, and peripherals 22 and 24. Bus slave 26, bus master 14, bus master 15, bus arbitration logic 28, and bus interface 18 are all bidirectionally coupled to system bus 16. Bus interface 18, peripheral 22, and peripheral 24 are all bidirectionally coupled to peripheral bus 20. Peripheral 22 includes peripheral circuitry 19 and peripheral registers 21, and peripheral 24 includes peripheral circuitry 23 and peripheral registers 25. Although only two peripherals 22 and 24 are illustrated in FIG. 1, data processing system 10 may include any number of peripherals coupled to peripheral bus 20. Likewise, any number of bus masters and slaves may be coupled to system bus 16 and are not limited to those shown in FIG. 1. Also, while FIG. 1 illustrates bus arbitration logic 28 as a separate unit coupled to system bus 16, portions of bus arbitration logic 28 may be located in each of the bus masters (or in a portion of the bus masters) coupled to system bus 16. (Bus arbitration logic 28 may operate as any known bus arbiter in the art today).

In one embodiment, bus master 14 and bus master 15 may be processors, such as microprocessors, digital signal processors, etc., or may be any other type of master device, such as a direct memory access (DMA) unit. One or more of these bus masters may be trusted bus masters which are less susceptible to corruption than untrusted bus masters. For example, a trusted bus master may execute instructions that are completely controlled by the manufacturer of the bus master or the SoC (i.e. the software running on a trusted master can be considered trusted software.) That is, in one embodiment, third party software: is unable to execute on a trusted master and no third parties are allowed access to the trusted master. Alternatively, the level of trust (i.e. the level of security) for a trusted bus master may vary from completely trusted to less trusted and depends on the design of data processing system 10, but is generally more trusted than untrusted bus masters.

Similarly, any one or more of bus masters 14 and 15 may be untrusted bus masters, which are generally more accessible or susceptible to corruption. In one embodiment, untrusted bus masters may be general applications processors that may receive and execute third-party software (e.g. user developed software) or any other untrusted software (where the contents and the function of the software are generally unknown). Since the software is untrusted, it may be errant or hostile software which may attempt to corrupt other portions of data processing system 10 (such as other trusted bus masters or peripherals 22 and 24), introduce a virus into data processing system 10, or access secured information within bus master 14 or 15, peripherals 22 or 24, bus slave 26, or elsewhere within data processing system 10.

Also, note that a particular bus master may be considered trusted for some types of accesses and untrusted for others. For example, a same bus master may be considered trusted for reads and untrusted for writes. Therefore, each master can have different levels of trust for different types of accesses. Also, each bus master can have different privilege levels. For example, in one embodiment, one bus master may operate with a higher privilege level (such as in supervisor mode) while others may operate with a lower privilege level (such as in user mode). A particular privilege level is used to determine which resources a master is able to access.

Therefore, in one embodiment, as will be described below, each master within data processing system 10 has a corresponding set of trust attribute fields which determine the level of trust for the corresponding master for a particular type of bus access. Also, each bus master has a corresponding privilege modifier field which allows the privilege level for the corresponding master to be selectively adjusted for a particular bus access. Similarly, each peripheral such as peripherals 22 and 24 has a corresponding set of access control fields which determine the level of access supported by the given peripheral. For example, a particular peripheral may give more access to those masters that are identified as trusted or those that operate in a supervisor mode (i.e. have a supervisor privilege level). These privilege and trust attribute fields for the bus masters and the access control fields for the peripherals will be discussed in more detail below in reference to FIGS. 2-5.

Referring back to FIG. 1, bus slave 26 may be any slave device, such as, for example, a memory accessible by bus masters 14 and 15, as well as any type of peripheral which resides on the system bus, including the same types of peripherals as peripheral 22 and 24. Peripherals 22 and 24 may be any type of peripheral, such as a universal asynchronous receiver transmitter (UART), a real time clock (RTC), a keyboard controller, etc. Peripheral circuitry 19 permits communication between peripheral bus 20 and peripheral registers 21. Similarly, peripheral circuitry 23 permits communication between peripheral bus 20 and peripheral registers 25. In an alternate embodiment, peripheral 22 may be a memory unit where peripheral registers 21 would be memory address locations instead.

In operation, bus masters 14 and 15 request access of system bus 16 to request access to other slave devices coupled to system bus 16, such as bus slave 26, or to request access to peripherals 22 and 24 via bus interface 18. Bus interface 18, as will be described below, determines whether a request or particular type of request to a particular peripheral is allowed. If not allowed, bus interface 18 may provide a bus error response via system bus 16. However, if the request is allowed, bus interface 18 will provide any necessary bus protocol to complete the requested bus access. As mentioned above, each bus master 14 and 15 may have limited access to peripherals 22 and 24 as determined by its privilege level and level of trust and the access control fields of the peripheral being accessed.

Figure 2:
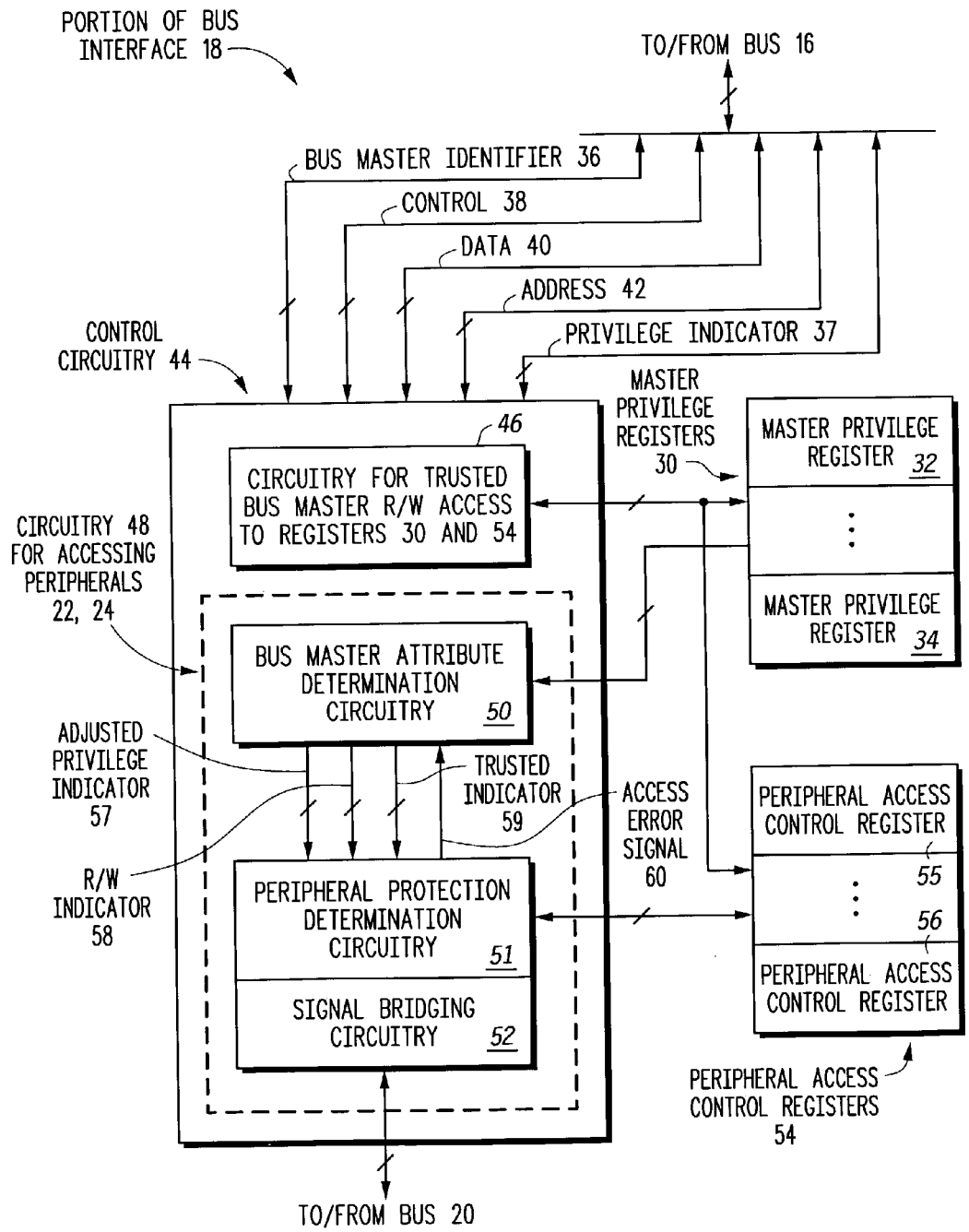
FIG. 2 illustrates, in block diagram form, a portion of a bus interface of FIG. 1, in accordance with one embodiment of the present invention.

FIG. 2 illustrates a portion of bus interface 18 of FIG. 1 in accordance with one embodiment of the present invention. Bus interface 18 includes control circuitry 44, master privilege registers 30, and peripheral access control registers 54. Control circuitry 44 provides and receives bus master identifier 36, address 42, data 40, control 38, and privilege indicator 37 via system bus 16. Control circuitry 44 includes circuitry 46 for trusted bus master read/write (R/W) access to registers 30 and 54 that are bidirectionally coupled to each of master privilege registers 30 and peripheral access control registers 54. Control circuitry 44 also includes circuitry 48 for accessing peripherals 22, 24. Circuitry 48 includes bus master attribute determination circuitry 50 which receives information from master privilege registers 30 and also includes peripheral protection determination circuitry 51 which receives information from peripheral access control registers 54. Control circuitry 48 also includes signal bridging circuitry 52 which is bidirectionally coupled to peripheral bus 20 in order to provide and receive appropriate signals to and from peripherals 22 and 24. Bus master attribute determination circuitry 50 also provides adjusted privilege indicator 57, R/W indicator 58, and trusted indicator 59 to peripheral protection determination circuitry 51 and receives access error signal 60 from peripheral protection determination circuitry 51. Note that access error signal 60 may also be communicated back to bus masters 14 and 15 via system bus 16. In an alternate embodiment, access error signal 60 is communicated via system bus 16 and is not provided to bus master attribute determination circuitry 50.

Master privilege registers 30 include master privilege register 32 and master privilege register 34. In one embodiment, each of the master privilege registers corresponds to a master on system bus 16. Also, in one embodiment, master privilege registers 30 may include only a single register, or alternatively, may include any number of registers, as will be described further below in reference to FIG. 3. Peripheral access control registers 54 include peripheral access control register 55 and peripheral access control register 56. In one embodiment, each of the peripheral access control registers corresponds to a peripheral on peripheral bus 20. Also, in one embodiment, peripheral access control registers 54 may include only a single register, or alternatively, may include any number of registers, as will be described further below in reference to FIG. 3. Also, note that master privilege registers 30 and peripheral access control registers 54 may be located anywhere within data processing system 10 and do not have to be located within bus interface 18. In some alternate embodiments of the present invention, peripheral access control registers may be distributed within each peripheral 22 and 24, or bus slave 26, and master privilege registers may be distributed, or may reside in one or more bus slaves 26.

In operation, bus interface 18 provides access to master privilege registers 30 and peripheral access control registers 54 based on bus master identifier 36. Bus master identifier 36 identifies to control circuitry 44 which bus master is providing the current request. For example, in one embodiment, each bus master in data processing system 10 may have a corresponding identification (ID) number. For example, bus master 14 may have a corresponding ID number of 0 and bus master 15 may have a corresponding ID number of 1. Any bus masters in data processing system 10 can therefore be assigned unique ID numbers. When a particular bus master requests access to a peripheral, its corresponding ID number can be provided to control circuitry 44 as bus master identifier 36. In this example, if bus master identifier 36 is 0, bus master 14 is indicated. In alternate embodiments, any type of identification system may be used to differentiate among different bus masters.

Bus interface 18, via circuitry 46, ensures that only a trusted bus master is able to obtain R/W access to master privilege registers 30 and peripheral access control registers 54. Circuitry 46 compares the incoming bus master identifier 36 to determine if a trusted bus master is requesting R/W access to registers 30 or registers 54. In one embodiment, circuitry 46 includes a list which identifies which bus masters are allowed to modify registers 30 and 54. For example, in one embodiment, only one of masters 14 and 15 may be considered a trusted master and only that trusted master has the ability to modify registers 30 and 54. Alternatively, circuitry 46 may include other circuitry that ensures that only trusted masters modify registers 30 and 54. Also, circuitry 46 may make this determination based on other attributes in addition to or in place of bus master identifier 36. For example, in an alternate embodiment, circuitry 46 may use privilege indicator 37 (which indicates a privilege level of the requesting bus master for the current bus access) to make the determination. In this manner, a trusted bus master is able to set the fields of registers 30 and 54 to control access of peripherals 22 and 24. In one embodiment, a trusted bus master may program the values into registers 30 and 54 upon power up, upon reset, in response to initiation of a software application, or at any other appropriate time. This allows for dynamic access to registers 30 and 54 such that they may be updated as necessary. Alternatively, though, the values within registers 30 and 54 may be programmed a single time (such as by using a write once only memory), programmed only a limited amount of times, or may be hardwired. Prior to discussing bus master attribute determination circuitry 50 within circuitry 48 for accessing peripherals 22, 24, the contents of registers 30 will be described in reference to FIG. 3.

Figure 3:
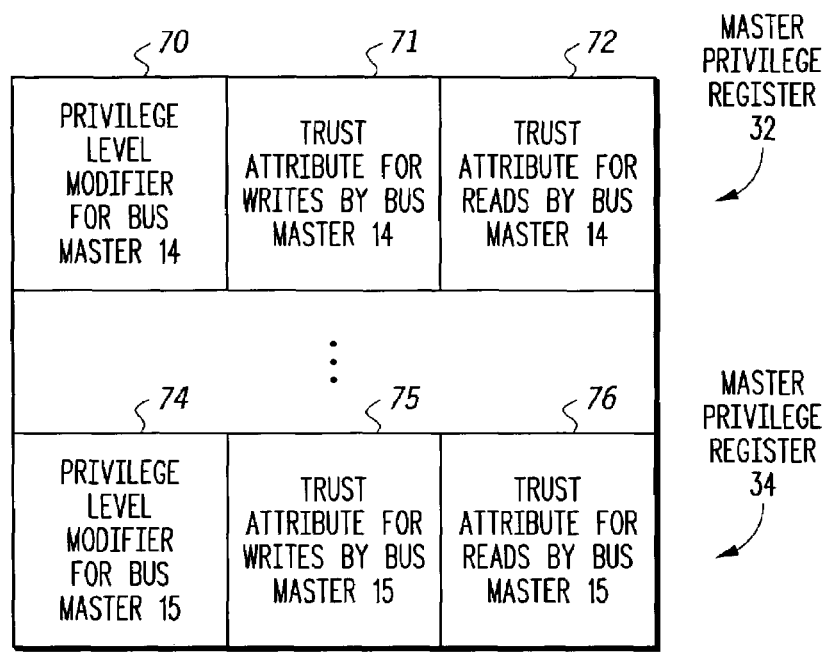
FIG. 3 illustrates, in block diagram form, master privilege registers in accordance with one embodiment of the present invention.

FIG. 3 illustrates one embodiment of master privilege registers 30 where, in the illustrated embodiment, master privilege registers 30 includes master privilege register 32 corresponding to bus master 14 and master privilege register 34 corresponding to bus master 15. Therefore, in the current embodiment, master privilege registers 30 includes one master privilege register for each bus master. However, in alternate embodiments, a single register may be used to store the necessary information for all masters, or, alternatively, any number and combination of registers may be used. Master privilege register 32 will be discussed herein as an example; however, note that the descriptions for master privilege register 32 also apply to all master privilege registers in master privilege registers 30 such as master privilege register 34. Master privilege register 32 includes a privilege level modifier for bus master 14 field 70, a trust attribute for writes by bus master 14 field 71, and a trust attribute for reads by bus master 14 field 72.

Privilege level modifier field 70 allows for the current privilege level of bus master 14 for a particular access to be selectively modified or adjusted, as indicated by the value stored in field 70. The current privilege of bus master 14, in one embodiment, is provided by bus master 14 to control circuitry 44 by privilege indicator 37 via system bus 16. In one embodiment, privilege indicator 37 is used to identify whether, during the current bus access, the current bus master (as identified by bus master identifier 36) requesting the bus access has a supervisor or user privilege level. That is, in this embodiment, privilege indicator 37 indicates a privilege level corresponding to one of supervisor or user mode. Therefore, if bus master 14 is performing a bus access, privilege level modifier field 70 may be used to indicate to bus master attribute determination circuitry 50 whether the privilege level of bus master 14 for the current bus access should be adjusted. For example, if operating in supervisor mode, privilege level modifier field 70 may be used to force the privilege level of bus master 14 to user mode. Alternatively, privilege level modifier field 70 can indicate any type of privilege level, and is not limited only to supervisor or user modes. Furthermore, privilege level modifier field 70 may include one or more bits used to provide the privilege level of bus master 14. For example, in one embodiment, one bit within privilege level modifier field 70 may be used to indicate whether or not the privilege level of a requesting bus master during a current bus access should be modified, and another one or more bits may be used to indicate what the adjusted privilege level should be. (Note that in some embodiments, the current privilege level may be the same as the privilege level indicated by field 70, indicated that no adjustment is necessary.)

Trust attribute for writes by bus master 14 field 71 is used to indicate whether bus master 14 is a trusted master for write accesses by bus master 14. Similarly, trust attribute for reads by bus master 14 field 72 is used to indicate whether bus master 14 is a trusted master for read accesses by bus master 14. Therefore, each bus master, such as bus master 14, may have different trust attributes for read or write access. For example, for performing a read access to a peripheral or bus slave, bus master 14 may be considered as a trusted master while for performing a write access from a peripheral or bus slave, bus master 14 may be considered as an untrusted master. Therefore, each of fields 71 and 72 may include one or more bits used to indicate the level of trust of bus master 14 for write and read accesses. In an alternate embodiment, a bus master may have more levels of trust for particular types of bus accesses rather than just being categorized as trusted or untrusted. For example, fields 71 and 72 may indicate one level from a selection of N levels of trust (N>2) for bus master 14.

Note that more or fewer or different fields than those illustrated may be included in master privilege register 32. For example, a single trust attribute field may be used for both writes and reads by bus master 14 where bus master 14 is either considered trusted or untrusted for both reads and writes. Alternatively, trust attributes may be provided for other types of bus accesses.

Note that the descriptions provided above for fields 70-72 also apply for fields 74-76 of master privilege register 34. That is, privilege level modifier for bus master 15 field 74 allows for the privilege level of bus master 15 to be selectively adjusted for a current bus access. Trust attribute for writes by bus master 15 field 75 indicates the level of trust of bus master 15 for a write access, and trust attribute for reads by bus master 15 field 76 indicates the level of trust of bus master 15 for a read access.

Returning to FIG. 2, circuitry 48 for accessing peripherals 22, 24 includes bus master attribute determination circuitry 50 which receives address 42, control 38, privilege indicator 37, and bus master identifier 36, and provides adjusted privilege indicator 57, R/W indicator 58, and trusted indicator 59 to peripheral protection determination circuitry 51. Therefore circuitry 50 receives all the information necessary that identifies the type of bus access (read or write), the peripheral requested, the identification of which bus master is making the request, and the privilege level of the bus master making the request. Using information stored in master privilege registers 30, as was described above, circuitry 50 determines the adjusted privilege indicator 57, R/W indicator 58, and trusted indicator 59. For example, a bus access may be initiated which requires access to a peripheral by a bus master (this bus access can be either a read or write bus access). During at least a portion of the bus access, bus master identifier 36 is provided. Bus master identifier 36 is used to select master privilege information (corresponding to the requesting bus master) from master privilege registers 30 for the bus access. The values for adjusted privilege indicator 57, R/W indicator 58, and trusted indicator 59 can then be determined.

For example, in one embodiment where bus master 14 is performing the current bus access, adjusted privilege indicator 57 is determined based on the current privilege level as indicated by privilege indicator 37 and privilege level modifier field 70. If privilege level modifier field 70 indicates that a particular privilege level should be forced upon bus master 14, then the value of adjusted privilege indicator 57 is set to indicate this forced privilege level. If privilege level modifier field 70 indicates that no privilege should be forced upon bus master 14, then the value of adjusted privilege indicator 57 can be set to indicate the same privilege level as privilege indicator 37. R/W indicator 58 can be determined from control 38 which indicates whether the current bus access is a read or a write access. Trusted indicator 59 is determined based on whether the current bus access is a read or a write access (as can be determined from control 38) and on trust attribute fields 71 and 72. For example, if the current bus access is a write access by bus master 14, then trusted indicator 59 is set to indicate the level of trust indicated by trust attribute field 71. Similarly, if the current bus access is a read access by bus master 14, then trusted indicator is set to indicate the level of trust indicated by trust attribute field 72.

Adjusted privilege indicator 57, R/W indicator 58, and trusted indicator 59, in combination with peripheral access control registers 54, are then used by peripheral protection determination circuitry 51 to determine whether an access to a peripheral is allowed or, in some cases, whether an access error is generated and communicated via access error signal 60 back to bus master attribute determination circuitry 50 and/or the bus master whose access request caused the error. Prior to discussing peripheral protection determination circuitry 51 within circuitry 48 for accessing peripherals 22, 24, the contents of registers 54 will be described in reference to FIG. 4.

Figure 4:
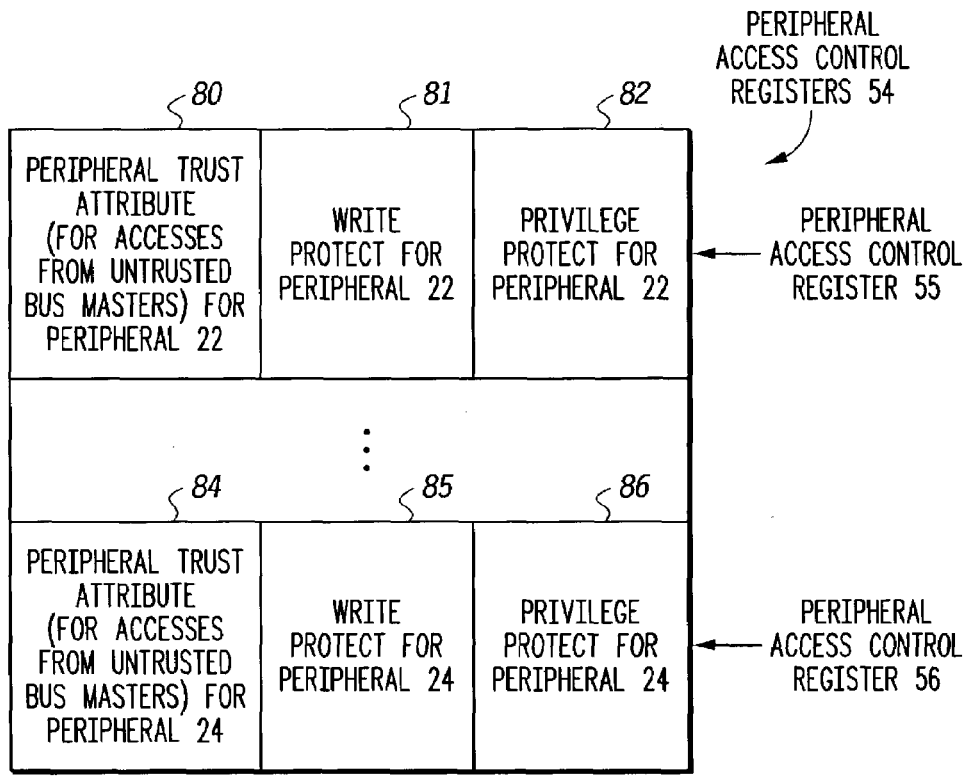
FIG. 4 illustrates, in block diagram form, peripheral access control registers in accordance with one embodiment of the present invention.

FIG. 4 illustrates one embodiment of peripheral access control registers 54 where, in the illustrated embodiment, peripheral access control registers 54 includes peripheral access control register 55 corresponding to peripheral 22 and peripheral access control register 56 corresponding to peripheral 24. Therefore, in the illustrated embodiment, peripheral access control registers 54 include one peripheral access control register for each peripheral. However, in alternate embodiments, a single register may be used to store the necessary information for all peripherals, or, alternatively, any number and combination of registers may be used. Peripheral access control register 55 will be discussed herein as an example; however, note that the descriptions for peripheral access control register 55 also apply to all peripheral access control registers in peripheral access control registers 54 such as peripheral access control register 56. Peripheral access control register 55 includes a peripheral trust attribute for peripheral 22 field 80, a write protect for peripheral 22 field 81, and a privilege protect for peripheral 22 field 82.

Peripheral trust attribute for peripheral 22 field 80 indicates whether peripheral 22 allows accesses (either reads or writes) from an untrusted master. For example, if the bus master performing the current bus access is untrusted, as indicated by the trust attribute fields corresponding to the current bus master (e.g. fields 71 and 72), then the bus access will only be allowed if field 80 indicates that accesses from an untrusted master are allowed. Write protect for peripheral 22 field 81 indicates whether peripheral 22 allows write accesses to itself by a master. For example, if the current bus access being performed by the current bus master (regardless of the level of trust of the bus master) is a write access to peripheral 22, then the write access cannot be performed if field 81 indicates that peripheral 22 is write protected. Privilege protect for peripheral 22 field 82 indicates whether peripheral 22 requires a certain privilege level for the current bus access. Therefore, privilege protect field 82 may include any number of bits that may indicate a minimum privilege level required for access to peripheral 22. In one embodiment, a single bit may be used to indicate whether or not a supervisor privilege is required. Alternatively, more bits may be used to indicate that a minimum one of N-levels of privilege (N>2) is required.

Note that more or fewer or different fields than those illustrated may be included in peripheral access control register 55. For example, separate peripheral trust attribute fields such as peripheral trust attribute field 80 may be used to indicate whether read accesses are allowed from an untrusted master and whether write accesses are allowed from an untrusted master. Also, additional bits or fields may be used to indicate a minimum level of trust of N possible levels of trust (N>2) needed for peripheral 22 to allow a read or a write access.

Note that the descriptions provided above for fields 80-82 also apply for fields 84-86 of peripheral access control register 56. That is, peripheral trust attribute for peripheral 24 field 84 indicates whether peripheral 24 allows accesses (either reads or writes) from an untrusted master. Write protect for peripheral 24 field 85 indicates whether peripheral 24 allows write accesses to itself by a master. Privilege protect for peripheral 24 field 86 indicates whether peripheral 24 requires a certain privilege level for the current bus access.

Returning to FIG. 2, circuitry 48 for accessing peripherals 22, 24 includes peripheral protection determination circuitry 51 which receives adjusted privilege indicator 57, R/W indicator 58, and trusted indicator 59 and provides access error signal 60 to bus master attribute determination circuitry 50. (Alternatively or additionally, access error signal 60 may be provided back to 15: the bus master whose request caused the error via system bus 16.) Therefore circuitry 51 uses indicators 57-59 and information stored in peripheral access control registers 54, as was described above, to determine whether the bus access to the requested peripheral is allowed. For example, if bus master 14 initiates a bus access for performing a write to peripheral 22, circuitry 51 determines if the bus access is allowed. For example, circuitry 51 uses adjusted privilege indicator 57 and privilege protect field 82 to determine whether peripheral 22 requires a particular privilege level for accesses (as indicated by field 82) and whether bus master 14 has the required privilege level (as indicated by adjusted privilege indicator 57). Circuitry 51 also uses R/W indicator 58 and write protect field 81 to determine whether the current bus access is a write access, and if so, whether write accesses are allowed to peripheral 22. Circuitry 51 also uses trusted indicator 59 and peripheral trust attribute field 80 to determine whether bus master 14 has the appropriate level of trust (indicated by trusted indicator 59) as required by peripheral 22 (indicated by field 80). Therefore, circuitry 51, using all the above information, can determine whether the bus access requested by bus master 14 to peripheral 22 is allowed. That is, bus master 14 needs to have the appropriate privilege level and the appropriate level of trust, and, if the bus access is a write, peripheral 22 must not be write protected, for the bus access to be allowed.

If access is allowed (meaning the requesting bus master does have the appropriate access permission for the particular peripheral being requested), then operation continues (i.e. the bus access continues) and the necessary bus protocol is provided to complete the operation. For example, signal bridging circuitry 52 provides any appropriate data, address, and control signals to the accessed peripheral derived from control 38, data 40, and address 42. Similarly, signal bridging circuitry 52 returns any necessary control, data, and address information to system bus 16 via control 38, data 40, and address 42. Also, status information may be returned by way of control 38.

However, if access is not allowed (meaning the requesting bus master does not have the appropriate access permission for the particular peripheral being requested), the bus access is terminated prior to accessing the peripheral. Also, access error signal 60 may be used to indicate that the requesting bus master is denied access to the peripheral. Also, a bus error may be provided via system bus 16 to the requesting bus master. The bus error can be provided by bus master permission determination circuitry 50 as one of control signals 38. In response, the requesting bus master may perform appropriate exception handling to recover from the bus error. Alternatively, if access is not allowed, a reset of all or a portion of data processing system 10 may be performed.

As discussed above, a trusted bus master may dynamically change permissions in registers 30 and 54 as necessary. In one embodiment, the trusted bus master may change permissions in response to the initiation of a software application. For example, an untrusted bus master may alert a trusted bus master that it is preparing to begin a software application. In response, the trusted bus master may update registers 30 and 54 in order to provide the untrusted bus master access to the necessary peripheral in order to complete its application. Upon completing the application, the trusted bus master may revoke the permissions previously granted such that permissions are only granted on an application by application basis.

In an alternate embodiment, peripheral 22 or 24 may be a memory unit where peripheral registers 21 or 25 may be memory locations. Registers 30 and 54, in this embodiment, can define access permissions corresponding to each bus master to specific memory locations or portions of the memory unit.

Also note that in alternate embodiments, the information stored in registers 30 can be located within each corresponding master and the information stored in registers 54 can be located within each peripheral rather than in bus interface 18. Furthermore, the bus master permission determination circuitry may also be located in or next to the masters and the peripheral protection determination circuitry can be located in or next to the peripherals such that permission is determined by the peripheral. Therefore, alternate embodiments may store the information of registers 30 and 54 that is accessible by a trusted bus master in any place within the memory map of data processing system 10. Also, data processing system 10 may include any number of trusted bus masters that are capable of updating the permission information, and is not limited to a single secure bus master.

Figure 5:
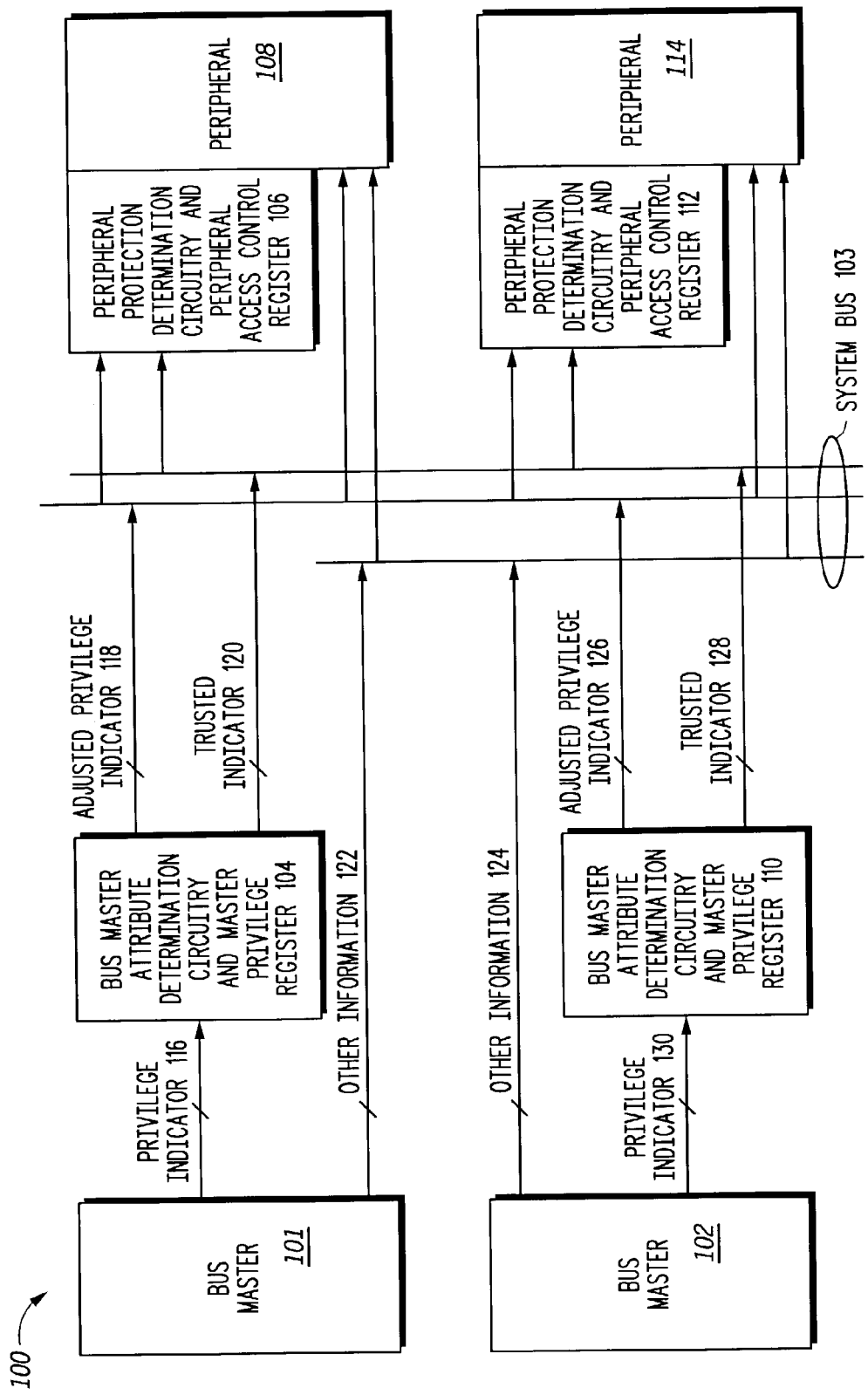
FIG. 5 illustrates, in block diagram form, a data processing system in accordance with an alternate embodiment of the present invention.

FIG. 5 illustrates data processing system 100 in accordance with an alternate embodiment of the present invention. Data processing system 100 includes bus master 101, bus master 102, bus master attribute determination circuitry and master privilege register 104, bus master attribute determination circuitry and master privilege register 110, peripheral protection determination circuitry and peripheral access control register 106, peripheral protection determination circuitry and peripheral access control register 112, and peripherals 108 and 114. Bus master 101 provides privilege indicator 116 to bus master attribute determination circuitry and master privilege register 104, which provides adjusted privilege indicator 118 via a system bus 103 to peripheral protection determination circuitry and peripheral access control registers 106 and 112 and to peripherals 108 and 114 and provides trusted indicator 120 via system bus 103 to peripheral protection determination circuitry and peripheral access control registers 106 and 112. Bus master 101 also provides other information 122 via system bus 103 to peripheral protection determination circuitry and peripheral access control registers 106 and 112 and to peripherals 108 and 114. Bus master 102 provides privilege indicator 130 to bus master attribute determination circuitry and master privilege register 110, which provides adjusted privilege indicator 126 via a system bus 103 to peripheral protection determination circuitry and peripheral access control registers 106 and 112 and to peripherals 108 and 114 and provides trusted indicator 128 via system bus 103 to peripheral protection determination circuitry and peripheral access control registers 106 and 112. Bus master 102 also provides other information 124 via system bus 103 to peripheral protection determination circuitry and peripheral access control registers 106 and 112 and to peripherals 108 and 114.

In operation, data processing system 100 operates similarly to data processing system 10. For example, masters 101 and 102 may be similar to masters 14 and 15, and peripherals 108 and 114 may be similar to peripherals 22 and 24. Also, data processing system 100 may include any number of masters and any number of peripherals. However, in data processing system 100, portions of bus interface 18 are distributed to different locations. Also, in data processing system 100, trusted indicators 120 and 128 are provided via system bus 103 to peripheral protection determination circuitry and peripheral access control registers 106 and 112. Also, privilege indicators 116 and 130 are selectively modified by bus master attribute determination circuitry and master privilege registers 104 and 110, respectively, and provided as adjusted privilege indicators 118 and 126 via system bus 103 to peripheral protection determination circuitry and peripheral access control registers 106 and 112 and peripherals 108 and 114. Note that each of bus master attribute determination circuitry and master privilege registers 104 and 110 operate similarly to bus master attribute determination circuitry 50 and master privilege registers 30, described above in reference to FIGS. 2-4. For example, the information stored in the master privilege registers and peripheral access control registers are used in the same manner to determine whether a bus access is allowed. Other information 122 and 124 may include information like control 38, data 40, address 42, and bus master identifier 36. Therefore, the same signals may be used as described in FIGS. 1-4 above; however, the circuitry which generates the signals or some of the signals themselves may be located in different places or structured differently.

Note that in the illustrated embodiment of FIG. 5, bus master identifier 36 of FIG. 2 is optional because each bus master 101 and 102 has a corresponding bus master attribute determination circuitry and master privilege register. Therefore, the determination circuitry and master privilege register are distributed with each master. For example, each determination circuitry and master privilege register can include the privilege level and trust attribute fields (such as fields 70-72 and 74-76) corresponding to its corresponding bus master. The circuitry and the information stored in the master privilege register can be located within each master or in communication between the master and the system bus. Also, the peripheral protection determination circuitry 51 and the peripheral access registers 54 may be distributed with each peripheral. For example, as illustrated in FIG. 5, each peripheral 108 and 114 has a corresponding peripheral protection determination circuitry and peripheral access control register where each peripheral protection determination circuitry and peripheral access control register can include access control fields (such as fields 80-82 and 84-86) corresponding to its corresponding peripheral. Also note that peripherals 108 and 116 may be any type of peripheral, memory device, or bus slave, as described earlier with reference to data processing system 10, thus are not limited in scope to a particular function.

Note that although FIGS. 1 and 2 illustrate the use of bidirectional conductors, it should be understood that a combination of unidirectional conductors may be used instead. Alternatively, a combination of bidirectional and unidirectional conductors may used. Signals may also be transferred serially via a single conductor or in parallel via a plurality of conductors. Alternatively, signals may be time multiplexed on a single or a plurality of conductors. Also, note that signals illustrated as bidirectional conductors may be replaced with unidirectional conductors, and unidirectional conductors may be replaced with bidirectional conductors.

In the foregoing specification, the invention has been described with reference to specific embodiments. However, one of ordinary skill in the art appreciates that various modifications and changes can be made without departing from the scope of the present invention as set forth in the claims below. For example, it should be understood that data processing system 10 and 100 could be any type of data processing system which can be located on a single chip or integrated circuit (IC) or a combination of chips or ICs. Data processing system 10 and 100 can also apply to a variety of masters and slaves located on a network (coupled via a network system bus) having shared peripherals. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for providing peripheral access protection in a data processing system having a bus, the method comprising:
    initiating a bus access by a first bus master which requires access to a peripheral, the first bus master operating at a privilege level selected from a plurality of privilege levels;
    providing a privilege indicator which is associated with the bus access, the privilege indicator indicating the privilege level selected from the plurality of privilege levels;
    providing a privilege level modifier corresponding to the first bus master, wherein the privilege level modifier is stored in a register field, and wherein the privilege level modifier corresponds to the first bus master only; and
    selectively adjusting the privilege indicator to indicate another privilege level of the plurality of privilege levels based upon a value of the privilege level modifier in order to produce a selectively adjusted privilege indicator, wherein the selectively adjusting comprises:
        adjusting the privilege indicator to indicate the another privilege level of the plurality of privilege levels when the privilege level modifier has a first value, and
        not adjusting the privilege indicator when the privilege level modifier has a second value, different from the first value; and
    using the selectively adjusted privilege indicator rather than the privilege indicator in determining if the bus access to the peripheral will be allowed, while the first bus master continues to operate at the privilege level selected from the plurality of privilege levels.

2. A method as in claim 1, wherein the privilege indicator is a supervisor/user signal.

3. A method as in claim 1, further comprising:
    providing at least one privilege protect bit for the peripheral to determine whether the peripheral requires supervisor privilege level for access.

4. A method as in claim 3, further comprising:
    providing at least one write protect bit for the peripheral to determine whether the peripheral allows write access.

5. A method as in claim 1, further comprising:
    providing at least one trust attribute corresponding to the first bus master; and
    using the at least one trust attribute to determine whether the first bus master is a trusted bus master.

6. A method as in claim 1, further comprising:
    initiating a second bus access which requires access to the peripheral;
    providing a second privilege indicator which is associated with the second bus access;
    providing a second privilege level modifier; and
    selectively adjusting the second privilege indicator based upon a value of the second privilege level modifier, wherein the second privilege level modifier corresponds to a second bus master.

7. A method as in claim 1, further comprising:
    providing at least one peripheral trust attribute for the peripheral; and
    using the at least one peripheral trust attribute to determine whether any access to the peripheral from an untrusted bus master is allowed.

8. A method as in claim 1, wherein the privilege level modifier is modifiable only once after reset.

9. A method for providing peripheral access protection in a data processing system having a bus, the method comprising:

initiating a bus access by a first bus master which requires access to a peripheral, the first bus master operating at a privilege level selected from a plurality of privilege levels;

providing a privilege indicator which is associated with the bus access, the privilege indicator indicating the privilege level selected from the plurality of privilege levels;

providing a privilege level modifier corresponding to the first bus master, wherein the privilege level modifier is stored in a register field, and wherein the privilege level modifier corresponds to the first bus master only; and selectively adjusting the privilege indicator to indicate another privilege level of the plurality of privilege levels based upon a value of the privilege level modifier in order to produce a selectively adjusted privilege indicator, wherein the selectively adjusting comprises:

adjusting the privilege indicator to indicate the another privilege level of the plurality of privilege levels when the privilege level modifier has a first value, and not adjusting the privilege indicator when the privilege level modifier has a second value, different from the first value;

using the selectively adjusted privilege indicator rather than the privilege indicator in determining if the bus access to the peripheral will be allowed, while the first bus master continues to operate at the privilege level selected from the plurality of privilege levels;

providing a plurality of trust attributes corresponding to the first bus master;

if the bus access is a read access, selecting a first trust attribute from the plurality of trust attributes;

if the bus access is a read access, using the first trust attribute to determine whether the first bus master is trusted for read accesses;

if the bus access is a write access, selecting a second trust attribute from the plurality of trust attributes; and if the bus access is a write access, using the second trust attribute to determine whether the first bus master is trusted for write accesses.

10. A method as in claim 9, wherein the first trust attribute is stored in a first register field, and wherein the second trust attribute is stored in a second register field.

11. A method as in claim 9, wherein one of the first trust attribute and the second trust attribute is provided as a trusted indicator signal.

12. A method as in claim 11, wherein the trusted indicator signal is provided by the bus.

13. A method for providing peripheral access protection in a data processing system having a bus, the method comprising:

initiating a bus access by a current bus master which requires access to a peripheral, the current bus master being selected from a group consisting of a first bus master and a second bus master, the first bus master having a corresponding first privilege level modifier, wherein the first privilege level modifier corresponds to the first bus master only and the second bus master having a corresponding second privilege level modifier, wherein the second privilege level modifier corresponds to the second bus master only;

providing a privilege indicator which is associated with the bus access, the privilege indicator indicating one of a plurality of privilege levels of the current bus master for accessing the peripheral;

providing a privilege level modifier corresponding to the current bus master;

selectively adjusting the privilege indicator to indicate another privilege level of the plurality of privilege levels based upon a value of the privilege level modifier in order to produce a selectively adjusted privilege indicator; and using the selectively adjusted privilege indicator rather than the privilege indicator determining if the bus access to the peripheral will be allowed.

* * * * *

UNITED STATES PATENT AND TRADEMARK OFFICE
CERTIFICATE OF CORRECTION

| | | |
|---|---|---|
| PATENT NO. | : 7,434,264 B2 | |
| APPLICATION NO. | : 10/384024 | |
| DATED | : October 7, 2008 | |
| INVENTOR(S) | : Moyer et al. | |

It is certified that error appears in the above-identified patent and that said Letters Patent is hereby corrected as shown below:

Title Page, item (57), under "Abstract", in column 2, line 15, delete "a the" and insert -- the --.

Column 12, line 56, in claim 6, delete "master." and insert -- master only. --.

Signed and Sealed this

Thirtieth Day of November, 2010

David J. Kappos
*Director of the United States Patent and Trademark Office*